(12) United States Patent
Ideno et al.

(10) Patent No.: US 7,387,699 B2
(45) Date of Patent: Jun. 17, 2008

(54) PROCESS OF PRODUCING HOLLOW SHAPED ARTICLES

(75) Inventors: Ryuji Ideno, Kanagawa (JP); Yoshinori Onose, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 282 days.

(21) Appl. No.: 11/211,642

(22) Filed: Aug. 26, 2005

(65) Prior Publication Data

US 2006/0042749 A1    Mar. 2, 2006

(30) Foreign Application Priority Data

Aug. 27, 2004  (JP) ............................. 2004-247872

(51) Int. Cl.
  *B29C 73/10*  (2006.01)
  *B29C 49/00*  (2006.01)
  *B29D 22/00*  (2006.01)
  *B32B 27/38*  (2006.01)

(52) U.S. Cl. ..................... 156/196; 428/35.7; 428/413; 264/545

(58) Field of Classification Search ............... 428/35.7, 428/413; 264/545; 156/196
See application file for complete search history.

(56) References Cited

U.S. PATENT DOCUMENTS

| | | | |
|---|---|---|---|
| 3,779,687 A * | 12/1973 | Alesi ........................... | 425/383 |
| 3,801,402 A | 4/1974 | Suter | |
| 4,719,135 A * | 1/1988 | Gerdes et al. .............. | 428/35.7 |
| 5,380,481 A | 1/1995 | Oberle, Jr. | |
| 5,902,643 A | 5/1999 | Carlblom et al. | |
| 6,969,485 B2 * | 11/2005 | Vorenkamp et al. ........ | 264/545 |
| 2003/0003308 A1 * | 1/2003 | Kashiba et al. .............. | 428/413 |
| 2004/0009315 A1 * | 1/2004 | Potter et al. ................ | 428/35.7 |
| 2004/0081787 A1 * | 4/2004 | Nomura et al. .......... | 428/36.91 |
| 2004/0096611 A1 | 5/2004 | Lucke et al. | |
| 2004/0230028 A1 * | 11/2004 | Sato et al. ................... | 528/347 |
| 2004/0247809 A1 * | 12/2004 | Dubois et al. ............. | 428/36.6 |

FOREIGN PATENT DOCUMENTS

| | | |
|---|---|---|
| EP | 0 026 954 | 4/1981 |
| EP | 0 888 867 | 1/1999 |
| EP | 1 375 575 | 1/2004 |
| EP | 1 437 393 | 7/2004 |
| WO | WO 95/26997 | 10/1995 |
| WO | WO 2004/062889 | 7/2004 |

OTHER PUBLICATIONS

European Search Report, for Application No. EP 05 10 7558, dated Nov. 28, 2005.

* cited by examiner

*Primary Examiner*—Joseph S. Del Sole
*Assistant Examiner*—Michael N Orlando
(74) *Attorney, Agent, or Firm*—Antonelli, Terry, Stout & Kraus, LLP.

(57) ABSTRACT

A process for producing a hollow shaped article having an inner surface which is brought into contact with fuels. The hollow shaped article is produced by bonding two or more constitutional members at peripheral edges thereof into an integral body. At least one of the constitutional members is produced by applying a fuel barrier coating composition to one or both surfaces of a thermoplastic resin sheet to form a sheet having a fuel barrier layer, and forming the sheet into the constitutional member by a pressure forming, a vacuum forming or a pressure/vacuum forming.

10 Claims, No Drawings

PROCESS OF PRODUCING HOLLOW SHAPED ARTICLES

BACKGROUND OF THE INVENTION

1. Field of the Invention

The present invention relates to a process of producing hollow shaped articles such as fuel containers for storing fuels such as gasoline.

2. Description of the Prior Art

As automobile fuel tanks, metal fuel tanks produced by press working and welding of iron plates, etc. have been used if putting much weight on the mechanical strength, and blown synthetic resin fuel tanks have been used if the processability is important. Particularly, to reduce the weight of vehicles and broaden the design freedom, thermoplastic resin fuel tanks have recently come to be used.

In the production of large blown fuel tanks, the thickness of upper portion of parison becomes thinner than the thickness of its lower portion when a heated parison in a flowable state is inserted into a mold from the top of molding machine. As a result, the resultant shaped article lacks the uniformity of thickness in some cases. If the shape of fuel tank is quite irregular or complicated, the degree of expansion of parison in a mold is likely to be different from portion to portion, to make the thickness uneven. Therefore, it is difficult to control the thickness of products. To attain satisfactory performance in the mechanical strength, etc., the thickness of products should be increased throughout its entire portions. This, however, increases the weight of fuel tanks. In a blow molding, a parison is molded with its periphery cramped between the parting faces of mold. Therefore, relatively large-sized flashes are formed, increasing the amount of wasted materials and reducing the productivity.

Since the parison is expanded in a mold in a blow molding, it is limited to dispose a fuel pump unit, a float, etc. inside a fuel tank being produced. To remedy this drawback, it has been proposed to mold an upper part and a lower part separately and then bond these parts into an integral fuel tank (JP 10-157738A).

To protect the environment, fuel tanks are required to have fuel barrier properties so as to prevent fuel, etc. from escaping into surrounding atmosphere through its wall. To ensure this, fuel tanks have been conventionally produced in a manner in which a fuel barrier film is first vacuum-formed in a mold into a barrier layer having a shape of fuel tank, and then, a thermoplastic resin for a substrate layer is injection-molded on the barrier layer so as to allow the barrier layer to face the inside of fuel tanks. However, since the barrier layer is sometimes stretched during the injection molding, the fuel tanks thus produced may have insufficient barrier properties. Also, the adhesion or bond strength between the barrier layer and the substrate layer made of thermoplastic resin is insufficient in some cases. In addition, it becomes sometimes difficult to allow the barrier layer to fully and completely extend to the peripheral ends, to reduce the fuel barrier properties.

In JP 2001-129851A, a production process of two-part fuel tank is proposed, in which each of two parts is injection-molded in each mold, the molded parts are butted to each other by sliding the molds, and then, a molten resin is injected around the butting faces to fuse-bond the two parts into a united body. However, this process requires a complicated equipment for sliding the molds, to increase production costs.

JP 2004-98886A discloses a process of producing fuel tanks by integrally bonding two constitutional parts at their peripheries around open ends, in which each constitutional part is produced by the injection molding or injection press molding of a thermoplastic resin having a low fuel permeability.

SUMMARY OF THE INVENTION

In view of the above problems in the conventional technique, an object of the present invention is to provide a process of producing hollow shaped articles such as fuel containers which are excellent in fuel barrier properties in an easy manner using a simple apparatus. Another object is to provide a process of producing hollow shaped articles such as fuel containers which are reduced in their weight.

As a result of extensive study in view of achieving the above objects, it has been found that the production of hollow shaped articles such as fuel containers excellent in fuel barrier properties can be made easy by the use of at least one constitutional member which is produced by forming a thermoplastic resin sheet having a fuel barrier layer made of a fuel barrier coating composition. The present invention is based on this finding.

Thus, the present invention provides a process for producing a hollow shaped article having an inner surface to be brought into contact with fuels, the process comprising a step of bonding two or more constitutional members at peripheral edges thereof into an integral body, provided that at least one of the constitutional members is produced by applying a fuel barrier coating composition to one or both surfaces of a thermoplastic resin sheet to produce a sheet having a fuel barrier layer, and forming the sheet into the constitutional member by a pressure forming, a vacuum forming or a pressure/vacuum forming.

DETAILED DESCRIPTION OF THE INVENTION

The hollow shaped articles referred to herein include any shaped articles having an inner surface which is brought into contact with fuels, such as fuel containers for fuel supply, fuel containers for fuel storage, and shaped articles in their use associated with such containers, for example, hoses, pipes, tubes, cocks, joints, etc. The hollow shaped articles are used in fuel supply systems of automobiles, motorcycles, ships, airplanes, electric generators, industrial or agricultural machines, and used in other applications using fuels.

The fuels referred to herein include gasoline, oxygen-containing gasoline blended with methanol, ethanol or methyl t-butyl ether, heavy oil, light oil, kerosene, etc.

The type of thermoplastic resin for the thermoplastic resin sheet is not critical in the present invention, and the thermoplastic resin sheet may be made of a mixture of two or more kinds of thermoplastic resins. The thermoplastic resin sheet may be a single-layered or multi-layered sheet, each layer being made of a single thermoplastic resin or a mixture thereof. The thickness of the thermoplastic resin sheet is preferably from 0.1 to 50 mm, more preferably from 0.5 to 40 mm, and still more preferably from 1 to 30 mm.

Examples of the thermoplastic resins include polyolefin resins such as polyethylene and polypropylene; polyester resins such as poly(ethylene terephthalate) and poly(butylene terephthalate); polyamide resins such as nylon 6, nylon 6,6, poly(m-xylylene adipamide) (N-MXD6); polyacrylonitrile resins; poly(meth)acrylic resins; polystyrene resins; polycarbonate resins; saponified ethylene-vinyl acetate copolymers (EVOH); and poly(vinyl alcohol) resins. Also usable are adhesive polyamide resins obtained by modifying polyethylene or polypropylene with maleic anhydride, etc. The thermoplastic resin sheet is preferably made of polyethylene in view of production economy, processability, mechanical strength, etc., and a thermoplastic resin sheet made of a polyethylene single layer is particularly preferred.

The fuel transmission coefficient at 60° C. of the fuel barrier layer is preferably 2 g·mm/m$^2$·day or less, more preferably 1 g·mm/m$^2$·day or less, and still more preferably 0.5 g·mm/m$^2$·day or less. If 2 g·mm/m$^2$·day or less, the thickness of the fuel barrier layer can be thinner to reduce the coating amount, this making it easy to control the thickness of the fuel barrier layer uniform and being economically advantageous.

The fuel barrier layer contains a structural unit represented by the following formula 1:

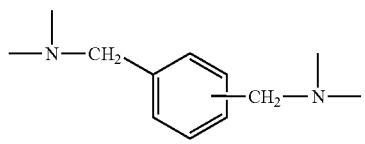

(1)

in an amount of preferably from 40 to 98% by weight, more preferably from 50 to 90% by weight, and still more preferably from 55 to 80% by weight.

The fuel barrier coating composition preferably contains an epoxy resin and a curing agent for epoxy resins, because the fuel barrier layer is formed at relatively low temperatures.

The epoxy resin may be any of aliphatic type, alicyclic type, aromatic type and heterocyclic type. To attain high fuel barrier properties, preferred are epoxy resins having an aromatic unit in its molecule, and more preferred are epoxy resins having the structural unit of the formula 1 in its molecule. Specific examples thereof include epoxy resins having a glycidylamine unit derived from m-xylylenediamine, epoxy resins having a glycidylamine unit derived from 1,3-bis(aminomethyl)cyclohexane, epoxy resins having a glycidylamine unit derived from diaminodiphenylmethane, epoxy resins having a glycidylamine unit derived from p-aminophenol and/or a glycidyl ether unit, epoxy resins having a glycidylamine unit derived from bisphenol F, epoxy resins having a glycidylamine unit derived from phenol novolak, and epoxy resins having a glycidylamine unit derived from resorcinol. Preferred are epoxy resins having a glycidylamine unit derived from m-xylylenediamine, epoxy resins having a glycidylamine unit derived from 1,3-bis(aminomethyl)cyclohexane, epoxy resins having a glycidylamine unit derived from bisphenol F, and epoxy resins having a glycidylamine unit derived from resorcinol.

The epoxy resin component of the fuel barrier coating composition preferably contains as the main ingredient an epoxy resin having a glycidyl ether unit derived from bisphenol F or an epoxy resin having a glycidylamine unit derived from m-xylylenediamine, and more preferably contains as the main ingredient an epoxy resin having a glycidylamine unit derived from m-xylylenediamine.

To improve properties such as flexibility, impact resistance, moist resistance and heat resistance, the epoxy resins may be used in combination in a desired mixing ratio.

The epoxy resins are produced by the reaction of epihalohydrin and at least one of alcohols, phenols and amines. For example, epoxy resins having a glycidylamine unit derived from m-xylylenediamine is produced by the addition reaction of epichlorohydrin to m-xylylenediamine. The glycidylamine unit derived from m-xylylenediamine includes mono-, di-, tri- and tetraglycidylamine units according to the degree of substitution of four amine hydrogens of m-xylylenediamine. The proportion of each glycidylamine unit can be controlled by changing the reaction molar ratio of m-xylylenediamine and epichlorohydrin. For example, epoxy resins mainly having the tetraglycidylamine unit is produced by the addition reaction of about four times by mole of epichlorohydrin to m-xylylenediamine.

The reaction of epichlorohydrin and at least one of alcohols, phenols and amines is conducted in the presence of an alkali such as sodium hydroxide at 20 to 140° C., preferably 50 to 120° C. if alcohols and phenols are used, 20 to 70° C. if amines are used, and then, the alkali halide generated is separated. The number average molecular weight of epoxy resin depends on the reaction molar ratio of epichlorohydrin to the alcohols, phenols and amines used, and about 80 to about 4,000, preferably about 200 to about 1,000, and more preferably about 200 to about 500.

The curing agent for epoxy resins may be any of aliphatic compounds, alicyclic compounds, aromatic compounds and heterocyclic compounds, and selected from common curing agents for epoxy resins such as polyamines, phenols, acid anhydrides and carboxylic acids. The curing agent is selected according to the degree of fuel barrier properties to be required.

Examples of polyamines include aliphatic amines such as ethylenediamine, diethylenetriamine, triethylenetetramine and tetraethylenepentamine; aliphatic amines including aromatic ring such as m-xylylenediamine and p-xylylenediamine; alicyclic amines such as 1,3-bis(aminomethyl)cyclohexane, isophoronediamine and norbornanediamine; and aromatic diamines such as diaminodiphenylmethane and m-phenylenediamine.

Also usable as the curing agent are epoxy resins derived from these polyamines, reaction products of polyamine with a monoglycidyl compound, reaction products of polyamine with an alkyleneoxide having form 2 to 4 carbon atoms, reaction products of polyamine with epichlorohydrin, reaction products of polyamine with an oligomerizable polyfunctional compound having at least one acyl group capable of forming an amide unit by the reaction with polyamine, and reaction products of polyamine with an oligomerizable polyfunctional compound having at least one acyl group capable of forming an amide unit by the reaction with polyamine and/or at least one of monocarboxylic acids and its derivatives.

Examples of phenols include polyhydric phenols such as catechol, resorcinol and hydroquinone; and resol-type phenol resins. Examples of acid anhydrides and carboxylic acids include aliphatic acid anhydrides such as dodecenylsuccinic anhydride and polyadipic anhydride; alicyclic acid anhydrides such as (methyl)tetrahydrophthalic anhydride and (methyl)hexahydrophthalic anhydride; aromatic acid anhydrides such as phthalic anhydride, trimellitic anhydride and pyromellitic anhydride; and carboxylic acids constituting the preceding anhydrides.

To attain high fuel barrier properties, preferred are curing agents having an aromatic unit in their molecules, and more preferred are curing agents having the structural unit of the formula 1 in their molecule. Specific examples thereof include m-xylylenediamine, p-xylylenediamine, epoxy resins derived from m- and/or p-xylylenediamine, reaction products of m- and/or p-xylylenediamine with a monoglycidyl compound, reaction products of m- and/or p-xylylenediamine with an alkyleneoxide having form 2 to 4 carbon atoms, reaction products of m- and/or p-xylylenediamine with epichlorohydrin, reaction products of m- and/or p-xylylenediamine with an oligomerizable polyfunctional compound having at least one acyl group capable of forming an amide unit by the reaction with m- and/or p-xylylenediamine, and reaction products of m- and/or p-xylylenediamine with an oligomerizable polyfunctional compound having at least one acyl group capable of forming an amide unit by the reaction with m- and/or p-xylylenediamine and at least one of monocarboxylic acids and its derivatives.

To attain high fuel barrier properties and a good adhesion to the thermoplastic resin sheet, the reaction products of the following components A and B or the reaction products of the following components A, B and C are particularly preferred as the curing agent for epoxy resins.

Component A: m-xylylenediamine or p-xylylenediamine.

Component B: oligomerizable polyfunctional compound having at least one acyl group capable of forming an amide unit by the reaction with m- or p-xylylenediamine.

Component C: monocarboxylic acid having from 1 to 8 carbon atoms and/or its derivative.

Examples of the component B include carboxylic acids such as acrylic acid, methacrylic acid, maleic acid, fumaric acid, succinic acid, malic acid, tartaric acid, adipic acid, isophthalic acid, terephthalic acid, pyromellitic acid, and trimellitic acid; and derivatives of the preceding carboxylic acids such as esters, amides, acid anhydrides and acid chlorides, with acrylic acid and methacrylic acid being preferred.

Examples of the component C include formic acid, acetic acid, propionic acid, butyric acid, lactic acid, glycolic acid, benzoic acid, and derivatives of the preceding carboxylic acids such as esters, amides, acid anhydrides and acid chlorides.

Since the amide unit is highly coherent, the fuel barrier properties and the adhesive strength of the fuel barrier layer to the thermoplastic resin sheet are more enhanced if the amide unit is contained in the curing agent in a large amount.

The reaction molar ratio of the component A and the component B, or the component A, the component B and the component C is preferably from 0.3 to 0.97 in terms of the molar ratio, (reactive functional group of component B)/(amino group of component A) or (total reactive functional group of component B and component C)/(amino group of component A). If less than 0.3, a sufficient amount of the amide unit cannot be introduced into the curing agent for epoxy resins, failing to attain high fuel barrier properties and a good adhesion to the thermoplastic resin sheet. In addition, the content of the volatile components remaining in the curing agent increases to cause the generation of odor from the cured product. Further, since the content of the hydroxyl group generated by the reaction of the epoxy group and the amino group in the cured product increases, the fuel barrier properties are extremely lowered under high humidity conditions. If higher than 0.97, the amount of the amino group to be reacted with the epoxy resin is insufficient to fail to attain a high impact resistance and heat resistance, and the solubility to organic solvents or water is reduced. To obtain a cured product exhibiting high fuel barrier properties, a high adhesion strength and high fuel barrier properties even under high humidity conditions without forming odor, the reaction molar ratio is more preferably from 0.6 to 0.97. If a still higher adhesion to the thermoplastic resin sheet is needed, the content of the amide unit is preferably at least 6% by weight and more preferably from 6 to 30% by weight based on the total weight of the curing agent. Particularly preferred curing agent for epoxy resins is a reaction product of m-xylylenediamine and at least one of acrylic acid, methacrylic acid and their derivatives.

The fuel barrier coating composition is applied to the thermoplastic resin sheet by any of common methods such as a dip coating, a spray coating, a brush coating, a roll coating and a flow coating.

The application to the thermoplastic resin sheet is conducted by regulating the concentration of the fuel barrier coating composition and the temperature such that a cured product of epoxy resin with high fuel barrier properties is obtained, although depending on the kinds of the epoxy resin and the curing agent and the application method. The fuel barrier coating composition may be solvent-free or may be diluted with a suitable organic solvent and/or water up to about 5% by weight at the lowest in terms of the concentration of the total of the epoxy resin and the curing agent for epoxy resins, according to the kinds of the epoxy resin and the curing agent, the weight ratio thereof and the application method. The mixing ratio of the curing agent to the epoxy resin in the fuel barrier coating composition is preferably from 0.3:1 to 20:1, more preferably from 0.5:1 to 10:1, and still more preferably from 0.8:1 to 5:1, in terms of the ratio of active hydrogens in the curing agent to epoxy groups in the epoxy resin. Examples of the organic solvents include toluene, xylene, ethyl acetate, butyl acetate, acetone, methyl ethyl ketone, glycol ethers such as 2-methoxyethanol, 2-ethoxyethanol, 2-propoxyethanol, 2-butoxyethanol, 1-methoxy-2-propanol and 1-ethoxy-2-propanol, 1-propoxy-2-propanol; alcohols such as methanol, ethanol, 1-propanol, 2-propanol, 1-butanol and 2-butanol, and aprotic polar solvents such as N,N- dimethylformamide, N,N-dimethylacetamide, dimethyl sulfoxide and N-methylpyrrolidone. These may be used alone or in combination of two or more.

The applied fuel barrier coating composition may be squeezed by air knife or roll to regulate the coated amount or to make the appearance and the thickness uniform.

To make the surface of the thermoplastic resin sheet more wettable, the fuel barrier coating composition may contain a wetting agent such as silicone compounds and acrylic compounds. Suitable wetting agents are BYK331, BYK333, BYK348, BYK381, etc., each available from BYK-Chemie GmbH. The content of the wetting agent, if used, is preferably from 0.01 to 2% by weight of the solid content of the fuel barrier coating composition.

To further improve the fuel barrier properties, impact resistance, heat resistance, etc. of the fuel barrier layer, the fuel barrier coating composition may contain inorganic fillers such as silica, alumina, mica, talc, aluminum flakes and glass flakes. To attain higher fuel barrier properties, the inorganic filler is preferably in the shape of flat plate. The content of the inorganic filler, if used, is preferably from 0.01 to 10% by weight of the solid content of the fuel barrier coating composition.

To further improve the adhesion of the fuel barrier layer to the thermoplastic resin sheet, the fuel barrier coating composition may contain a coupling agent such as silane coupling agent and titanium coupling agent. The content of the coupling agent, if used, is preferably from 0.01 to 5% by weight of the solid content of the fuel barrier coating composition.

The fuel barrier coating composition may further contain, if necessary, a catalyst for promoting the curing such as N-ethylmorpholine, dibutyltin dilaurate, cobalt naphthenate and tin (II) chloride; an organic solvent such as benzyl alcohol; a corrosion inhibitor such as zinc phosphate, iron phosphate, calcium molybdate, vanadium oxide, water-dispersed silica and fumed silica; an organic pigment such as phthalocyanine organic pigments and fused polycyclic organic pigments; and an inorganic pigment such as titanium oxide, zinc oxide, calcium carbonate, barium sulfate, alumina and carbon black, each in an effective amount.

The thickness of the fuel barrier layer formed from the fuel barrier coating composition is preferably from 1 to 500 μm, more preferably from 3 to 300 μm and still more preferably from 5 to 200 μm. If less than 1 μm, defects may be caused in the fuel barrier layer. If exceeding 500 μm, it is difficult to make the thickness uniform.

After applying the fuel barrier coating composition onto the surface of thermoplastic resin sheet, the sheet is formed into the constitutional member which constitutes a part of the hollow shaped article by a vacuum forming, a pressure forming or a pressure/vacuum forming. The applied fuel barrier coating composition may be cured or not prior to the forming process.

The temperature for curing the applied fuel barrier coating composition is preferably from 0 to 150° C., more preferably from 10 to 100° C., and still more preferably from 20 to 80° C. If higher than 150° C., the thermoplastic resin sheet is unfavorably deformed.

The curing time from the application until the applied fuel barrier coating composition is cured enough to prevent the suspended dusts in the surrounding atmosphere from adhering to its surface is preferably from 1 to 60 min, more preferably from 3 to 20 min, and still more preferably from 5 to 10 min. If exceeding 60 min, the productivity is reduced.

The applied fuel barrier coating composition is cured by any of known methods such as a dryer heating, an induction heating, a far infrared heating and a gas heating.

To enhance the adhesion of the fuel barrier layer to the thermoplastic resin sheet, the surface of the thermoplastic resin sheet may be surface-treated. The method of surface treatment is not limited as long as the adhesion is improved, and preferably conducted by a corona treatment, a flame treatment, a plasma treatment, an ultraviolet treatment, a chemical solution treatment, a primer treatment or a combination thereof, because these treatments are easy and well productive.

At least one protecting layer may be formed on the fuel barrier layer. The protecting layer is not limited as long as the fuel barrier layer is protected, and may be formed by any of known methods or by any combination of known methods.

If formed by application, the protective layer is formed, for example, from an epoxy resin coating composition, an urethane resin coating composition, a polyester resin coating composition, an acrylic resin coating composition, etc. If formed by laminating film or sheet, the protective layer is formed, for example, form a film or sheet of a polyolefin resin such as a low density polyethylene, a high density polyethylene, a linear low density polyethylene and polypropylene; a polyester resin such as poly(ethylene terephthalate) and poly(butylene terephthalate); a polyamide resin such as nylon 6, nylon 6,6 and poly(m-xylylene adipamide) (N-MXD6); a polyacrylonitrile resin; a poly(meth)acrylic resin; a polystyrene resin; a polycarbonate resin; a saponified ethylene-vinyl acetate copolymer (EVOH); or a poly (vinyl alcohol) resin. The protective layer is also formed from a paper material such as carton or a metal foil of aluminum or copper.

The hollow shaped article is produced by bonding two or more constitutional members at their peripheral edges into an integral body. At least one of the constitutional members is produced by forming the fuel barrier layer on one or both surfaces of the thermoplastic resin sheet from the fuel barrier coating composition, and then, by forming the sheet with the fuel barrier layer into the constitutional member by a pressure forming, a vacuum forming or a pressure/vacuum forming. The constitutional members are bonded such that the fuel barrier layer faces inside the hollow shaped article. To attain sufficient fuel barrier properties, the fuel barrier coating composition is applied to the thermoplastic resin sheet as completely as possible throughout its surface. The constitutional member may be made of metal.

The constitutional members are bonded by any manner as long as fuels do not leak through the bonded seams, for example, bonded by a heat fuse-bonding, a bonding with a molten resin, a mechanical bonding with screws, a bonding with an adhesive, or a combination thereof. The peripheral edges to be bonded may be shaped into a tongue-and-groove joint, although not limited to such shape. After bonding, a fuel barrier layer may be further formed on the inner surface and/or the outer surface of the resultant hollow shaped article by applying the fuel barrier coating composition.

The present invention will be explained in more detail by reference to the following examples which should not be construed to limit the scope of the present invention.

The fuel barrier layers were evaluated by the following methods.

Fuel Transmission Coefficient of Fuel Barrier Layer

On a 25-mL flanged aluminum cup (opening diameter: 38 mm) containing 20 mL of fuel (90 vol % of Fuel C (ASTM D 471)+10 vol % of ethanol), a thermoplastic resin sheet having a fuel barrier layer made of a fuel barrier coating composition was placed such that the fuel barrier layer faced the fuel. The thermoplastic resin sheet was closely fixed to the flanged aluminum cup by pressing with a flanged aluminum ring having an opening diameter of 38 mm. After allowing the cup to stand in a thermostatic chamber at 60° C. for 1000 h, the total loss of the fuel by transmission (transmitted amount of fuel) was measured. Using the measured value, the transmission area and the transmission time, was calculated the escaped amount of fuel (g) per 1 mm thickness of the thermoplastic resin sheet with the fuel barrier layer, 1 m² of the transmission area and one day. In the same manner, the escaped amount of fuel was determined on a thermoplastic resin sheet with no fuel barrier layer. Using these results, the fuel transmission coefficient $K_1$ (g·mm/m²·day) of the fuel barrier layer was calculated from the following equation:

$$K_1 = a/((a+b)/K - b/K_2)$$

wherein "a" is the thickness (mm) of the fuel barrier layer; "b" is the thickness (mm) of the thermoplastic resin layer; "K" is the escaped amount of fuel (g) per 1 mm thickness of the thermoplastic resin sheet with the fuel barrier layer, 1 m² of the transmission area and one day (fuel transmission coefficient, g·mm/m²·day, of thermoplastic resin sheet with the fuel barrier layer); and "$K_2$" is the escaped amount of fuel (g) per 1 mm thickness of the thermoplastic resin sheet only, 1 m² of the transmission area and one day (fuel transmission coefficient, g·mm/m²·day, of thermoplastic resin sheet only).

Adhesion of Fuel Barrier Layer

The adhesion of the fuel barrier layer to the thermoplastic resin sheet was measured according to the cross cut test of JIS K 5600-5-6. The results are shown by X/Y, wherein X is the number of cross cuts remained not peeled and Y is the number of cross cuts initially formed.

EXAMPLE 1

Using a UV surface processor ("PL 16-110", Kasuga Electric Works, Ltd.), a 2-mm thick polyethylene sheet (fuel transmission coefficient: 250 g·mm/m$^2$·day) was surface-treated for 30 s to regulate the wet surface tension to 45 mN/m. A fuel barrier coating composition was applied onto the treated surface of the polyethylene sheet by a spray coating. The fuel barrier coating composition contained an epoxy resin ("Tetrad-X" of Mitsubishi Gas Chemical Company, Inc.) having a glycidylamine unit derived from m-xylylenediamine and a reaction product (curing agent) of one mole of m-xylylenediamine and 0.93 mol of methyl acrylate. The mixing ratio of the curing agent and the epoxy resin was 1.0 in terms of the ratio as defined above.

The sheet thus obtained was formed into a constitutional member (100 mm×200 mm×50 mm) by a pressure/vacuum forming such that the applied surface faced inside. The applied fuel barrier coating composition was cured at 60° C. for 10 min to form a fuel barrier layer of about 20 μm thick. Then, a flange was formed around the peripheral edge. The fuel barrier layer had a fuel transmission coefficient of 0.1 g·mm/m$^2$·day and contained the structural unit of the formula 1 in an amount of 58% by weight. The adhesion of the fuel barrier layer to the polyethylene sheet is shown in Table 1.

In the same manner as above, two constitutional members each having a fuel barrier layer were produced. Into one of the constitutional members, 150 g of fuel (90 vol % of Fuel C (ASTM D 471)+10 vol % of ethanol) was introduced. Then, two constitutional members were hermetically bonded with screws to produce a tank containing fuel. The tank was evaluated for its fuel barrier properties by measuring the escaped amount of fuel at 60° C. The result is shown in Table 1.

EXAMPLE 2

Constitutional members and a tank were produced in the same manner as in Example 1 except that the wet surface tension of the polyethylene sheet was regulated into 76 mN/m by surface-treating with a plasma surface processor ("PS-601S" of Kasuga Electric Works, Ltd.) at a moving speed of 10 m/min. The results of evaluating the adhesion and fuel barrier properties are shown in Table 1.

EXAMPLE 3

Constitutional members and a tank were produced in the same manner as in Example 1 except that the wet surface tension of the polyethylene sheet was regulated into 50 mN/m by surface-treating with a flame surface processor (Arcogas GmbH) at a moving speed of 50 m/min. The results of evaluating the adhesion and fuel barrier properties are shown in Table 1.

EXAMPLE 4

Constitutional members and a tank were produced in the same manner as in Example 1 except that the applied fuel barrier coating composition was cured at 100° C. for 10 min. The results of evaluating the adhesion and fuel barrier properties are shown in Table 1.

EXAMPLE 5

Constitutional members and a tank were produced in the same manner as in Example 1 except for using a nylon 6,6 sheet not surface-treated (wet surface tension: 41 mN/m). The results of evaluating the adhesion and fuel barrier properties are shown in Table 1.

EXAMPLE 6

Constitutional members and a tank were produced in the same manner as in Example 1 except that a fuel barrier layer was formed from a fuel barrier coating composition containing, in place of the epoxy resin ("Tetrad-X" of Mitsubishi Gas Chemical Company, Inc.), an epoxy resin ("Epikote 828" of Japan Epoxy Resins Co., Ltd.) having a glycidyl ether unit derived from bisphenol A). The fuel barrier layer had a fuel transmission coefficient of 1.2 g·mm/m$^2$·day and contained the structural unit of the formula 1 in an amount of 37% by weight. The results of evaluating the adhesion and fuel barrier properties are shown in Table 1.

TABLE 1

| Examples | Cross Cut Test JIS K 5600-5-6 | Escaped Amount of Fuel g/day |
|---|---|---|
| 1 | 25/25 | 0.32 |
| 2 | 25/25 | 0.33 |
| 3 | 25/25 | 0.32 |
| 4 | 25/25 | 0.28 |
| 5 | 25/25 | 0.21 |
| 6 | 25/25 | 6.02 |

According to the process of the present invention, highly fuel-barrier hollow shaped articles having inner surfaces to be brought into contact with fuels such as fuel container can be easily produced in low production costs.

What is claimed is:

1. A process for producing a hollow shaped article having an inner surface to be brought into contact with fuels, the process comprising a step of bonding two or more constitutional members at peripheral edges thereof into an integral body, provided that at least one of the constitutional members is produced by applying a fuel barrier coating composition to one or both surfaces of a thermoplastic resin sheet of 1-30 mm thickness to form a sheet having a fuel barrier layer of 5-200 μm in thickness, and forming the sheet into the constitutional member by a pressure forming, a vacuum forming or a pressure/vacuum forming, wherein the fuel barrier coating composition comprises an epoxy resin and a curing agent for epoxy resins, and wherein the epoxy resin mainly comprises a glycidylamine unit derived from m-xylylenediamine.

2. The process according to claim 1, wherein a fuel transmission coefficient of the fuel barrier layer is 2 g·mm/m$^2$·day or less at 60° C.

3. The process according to claim 1, wherein the fuel barrier layer contains a structural unit represented by the following formula 1:

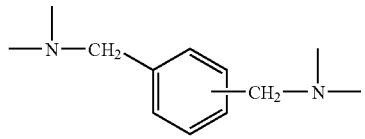

in an amount of from 40 to 98% by weight.

4. The process according to claim 1, wherein the curing agent for epoxy resins is a reaction product of m-xylylenediamine and at least one of acrylic acid, methacrylic acid and derivatives thereof.

5. The process according to claim 1, wherein the thermoplastic resin is polyethylene.

6. The process according to claim 1, wherein the fuel barrier coating composition is applied by a dip coating, a spray coating, a brush coating, a roll coating or a flow coating.

7. The process according to claim 1, wherein the fuel barrier coating composition is cured at a curing temperature of 150° C. or lower and within a curing time of one hour or shorter.

8. The process according to claim 1, wherein a surface of the thermoplastic resin sheet to be applied with the fuel barrier coating composition is surface-treated in advance.

9. The process according to claim 8, wherein the surface treatment is conducted by a corona treatment, a flame treatment, a plasma treatment, an ultraviolet treatment, a chemical solution treatment or a primer treatment.

10. The process according to claim 1, wherein at least one protective layer is formed on the fuel barrier layer.

* * * * *